United States Patent [19]

Hechenbleikner et al.

[11] 4,104,252

[45] Aug. 1, 1978

[54] OLEFIN POLYMER STABILIZER

[75] Inventors: Ingenuin Hechenbleikner, West Cornwall; William Palmer Enlow, Falls Village, both of Conn.

[73] Assignee: Borg-Warner Corporation, Chicago, Ill.

[21] Appl. No.: 836,282

[22] Filed: Sep. 26, 1977

[51] Int. Cl.² ............... C08K 5/17; C07C 101/20
[52] U.S. Cl. ................ 260/45.8 R; 260/45.85 S; 260/45.85 N; 560/171
[58] Field of Search ............. 260/45.85 N, 45.85 S, 260/45.8 R, 31.8 K, 45.8 ST; 560/171

[56] References Cited

U.S. PATENT DOCUMENTS

| | | | |
|---|---|---|---|
| 2,296,331 | 9/1942 | Bögemann et al. | 560/171 |
| 3,081,335 | 3/1963 | Morris et al. | 260/45.85 N |
| 3,278,478 | 10/1966 | Masterson et al. | 560/171 |
| 3,691,132 | 9/1972 | Brown et al. | 260/45.85 T |
| 3,763,287 | 10/1973 | Chiddix et al. | 260/45.95 D |

*Primary Examiner*—V. P. Hoke
*Attorney, Agent, or Firm*—Joseph Shekleton

[57] ABSTRACT

An olefin polymer additive having the structure

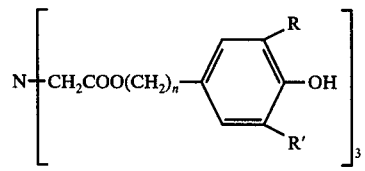

where R and R' are alkyl radicals and $n$ is 1–4. Its presence in an olfin polymer renders that polymer more stable to heat and ultraviolet irradiation.

9 Claims, No Drawings

OLEFIN POLYMER STABILIZER

This invention relates as indicated to olefin polymer stabilizers. More particularly, it relates to such stabilizers which are especially effective to impart significant heat and light stability to the olefin polymer compositions in which they are present.

BACKGROUND OF THE INVENTION

Ultraviolet light has a degradative effect on olefin polymers; the severity of this effect is dependent on the particular polymer and the geographical location of exposure. The degradation may take the form of discoloration, loss of tensile and impact strength, distortion of initial flexibility, dimensional change, surface craze, cracking, powdering or increased electrical conductivity. All of these effects may result from the breaking of carbon-to-carbon bonds in the polymer chain followed by immediate oxidation of the chain fragments.

It is well known that the addition of certain materials to an olefin polymer will impart a degree of stabilization to that polymer with respect to its resistance to the destructive function as preferential acceptors of incident ultraviolet radiation because they have a much higher affinity for such radiation than does the olefin polymer. It appears that they absorb harmful radiation and dissipate it as harmless energy. They thus form a protective shield for the polymer in which they are present.

The need for stability to exposure to ultraviolet light is apparent. Any olefin polymer composition which is to be used in the outdoor atmosphere, i.e., exposed to sunlight, will suffer the deteriorating influence of ultraviolet radiation and must be capable of withstanding that deterioration.

Stability toward excessive heat is also required of olefin polymer compositions. The mere act of mixing polymer compositions and then fabricating them into usable shapes invariably requires the use of high temperatures and it is obviously important that the polymer composition remain substantially unchanged throughout any such treatment.

Chiddix et al. (U.S. Pat. No. 3,763,287) show antioxidant compounds having the structure

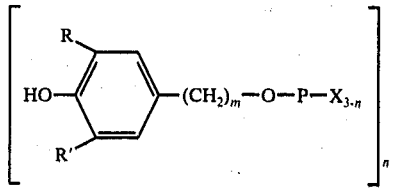

where R and R' are alkyl, aralkyl or cycloalkyl; $m$ is 1-4; X is alkyl, aryl, aralkyl, cycloalkyl, alkylphenoxy, thioalkyl, thiophenyl, haloalkyl, or alkylcarboxyl; and $n$ is 1-3. Also shown are the corresponding phosphates and thiophosphates. These compounds are said to be useful as antioxidants in a wide variety of organic compounds normally susceptible to oxidation, including plastics, elastomers, synthetic lubricants, hydraulic fluids, hydrocarbon lubricants, fuels, fats, oils, etc.

Chiddix et al. (U.K. Pat. No. 1,355,109) show somewhat similar compounds where the P-$X_{3-n}$ is replaced by COR, R being an $n$ valent organic radical such as alkyl or cycloalkyl.

Dexter et al. (U.S. Pat. No. 3,285,855) show esters of hindered hydroxyphenylalkanoic acids having the structure

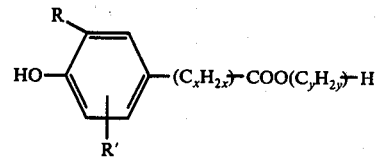

where R and R' are lower alkyl, $x$ is 0-6 and $y$ is 6-30. These esters likewise are said to be effective antioxidants in a wide variety of organic materials normally susceptible to oxidation. Dexter et al. (U.S. Pat. No. 3,330,859) show substantially the same thing. Dexter et al. (U.S. Pat. No. 3,644,842) show much the same except that the alcohol portion of the ester is derived from a glycol, viz., neopentylglycol, glycerin, ethylene glycol, propylene glycol, 1,18-octadecanediol, pentaerythritol, etc.

Hechenbleikner et al. (U.S. Pat. No. 3,839,506) show certain phosphonates having the structure

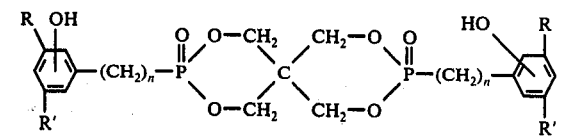

where $n$ is 1-4 and R and R' can be alkyl of 1-20 carbon atoms.

The invention of this application is a substituted nitriloacetate having the structure

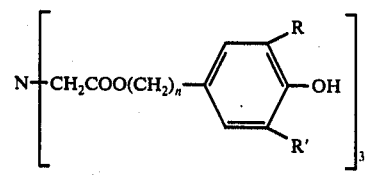

where R and R' are lower alkyl radicals and $n$ is 1-4. Preferably, they are tertiary alkyl radicals and, in the usual instance, they are the same. In the usual case, $n$ is 3. The nitriloacetates may be prepared by transesterification of trimethyl nitriloacetate with a 3(3,5-dialkyl-4-hydroxyphenyl) propanol, as follows:

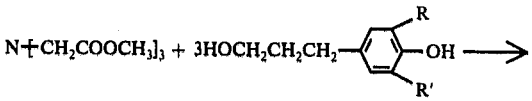

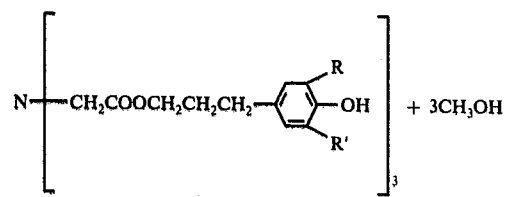

The use of a molecular sieve to accept the methanol as it is formed in the reaction is helpful. The tris-3(3,5-ditertiarybutyl-4-hydroxyphenyl)propyl nitriloacetate which is prepared by such a process is a pale yellow crystalline solid melting at 108°–110° C.

R and R' are as indicated lower alkyl radicals, i.e., they each contain 1–8 carbon atoms. Preferably they are tertiary alkyl radicals and, usually, they are alike. Tertiary butyl radicals are especially preferred.

The above-substituted nitriloacetates impart significant heat and light stability to olefin polymer compositions in which they are present.

Typical preparation of the substituted nitriloacetates herein are shown in the following examples.

EXAMPLE 1

A solution of 27.72 g. (0.105 mol) of 3(3,5-di-t-butyl-4-hydroxyphenyl)propanol, 7.69 g. (0.03 mol) of trimethyl nitriloacetate and 0.1 g. of sodium methylate in 300 ml. of heptane is heated with stirring at 100° C in an atmosphere of nitrogen for one hour. A total of 4 ml. of methanol is distilled from the reaction mixture at which point the mixture is stripped to a final temperature of 150° C/0.1 mm. The residue is dissolved in heptane, filtered through a siliceous filter aid, and the filtrate concentrated to a dark, fluid material which is the tris-(3,(3,5-di-t-butyl-4-hydroxyphenyl)propyl)nitriloacetate.

EXAMPLE 2

A mixture of 22.0 g. (0.083 mol) of 3(3,5-di-t-butyl-4-hydroxyphenyl)propanol, 6.1 g. (0.026 mol) of trimethyl nitriloacetate, 0.5 g. of sodium methylate, 46 g. of Linde 5A molecular sieve and 300 ml. of benzene is heated at reflux temperature for two hours and then filtered to remove the molecular sieve. The filtrate is concentrated to about half its volume, cooled and filtered. The pale yellow, crystalline solid melts at 106°–108° C; it is the desired tris(3,(3,5-di-t-butyl-4-hydroxyphenyl)propyl) nitriloacetate. Recrystallization from pentane raises the melting point to 108°–110° C.

The effectiveness of the substituted nitriloacetates as olefin polymer stabilizers is shown by data set forth in Table I. The data is obtained from an oven test which is carried out at 150° C. A 1 inch × 1 inch × 25 mil sample is placed in the oven, through which circulating hot air is passed, and removed for inspection at frequent intervals. The sample is rated "fail" when it becomes discolored and crazes, i.e., develops minute surface cracks. Each sample consists of polypropylene plus 0.05 phr (parts per hundred parts of polyproplylene) of calcium stearate, 0.25 phr of distearyl thiodipropionate and substituted nitriloacetate (if any).

TABLE I

| | Substituted Nitriloacetate | Hours to Failure |
|---|---|---|
| 1. | None | 133 |
| 2. | 0.1 phr of product of Example 1 | 737 |
| 3. | 0.2 phr of product of Example 1 | 1065 |
| 4. | 0.1 phr of product of Example 2 | 795 |
| 5. | 0.2 phr of product of Example 2 | 1123 |
| 6. | *0.25 phr of product of Example 2 | 1316 |

*contains 0.2 phr distearyl thiodipropionate.

It will be seen that the substituted nitriloacetate is effective to impart a high degree of heat stability to polypropylene.

The light stability of an olefin polymer likewise is improved by the presence of a small proportion of the substituted nitriloacetate of this invention. This is shown by the data of Table II wherein the results of a light stability test are set forth. The test samples are fibers having a denier of 200/16. They are exposed to sunlight in the Caribbean region; the extent of exposure is measured in terms of kilolangleys. The tensile strength of the samples is determined at the beginning of the test, and from time to time thereafter. The sample is deemed a failure when the tensile strength of the fiber is one-half its original value and the number of kilolangleys required to produce that result is taken as a measure of the ability of the sample to withstand degradation caused by sunlight. The samples shown in Table II each contain polypropylene plus 0.15 phr of distearylpentaerythritol diphosphite, 0.05 phr of calcium sterate, and substituted nitriloacetate (if any).

TABLE II

| | Substituted Nitriloacetate | Kilolangleys |
|---|---|---|
| 1. | None | 16 |
| 2. | 0.15 phr of product of Example 1 | 28 |
| 3. | 0.30 phr of product of Example 1 | 30 |

The olefin polymer may be any homopolymer or copolymer of a monoolefin or diolefin, preferably those having 1–5 carbon atoms. Illustrative examples include polyethylene (both low and high density), polypropylene, polyisobutylene, polybutadiene, polyisoprene, and copolymers of ethylene, propylene, isobutylene, butadiene and isoprene.

Olefin polymer compositions containing the substituted nitriloacetates herein will frequently contain also a small proportion of a metal salt of a high fatty acid, calcium, zinc and cadmium salts of carboxylic acids having 12–18 carbon atoms are preferred and calcium stearate is especially preferred. The metal salt serves as a lubricant, facilitating the compounding of the finally formulated olefin polymer composition. From about 0.1 to about 2.0 phr should be used.

The olefin polymer compositions may also contain an organic phosphite which serves both as a heat stabilizer and an antioxidant. Pentaerythritol phosphites are most usually used in such compositions especially dialkylpentaerythritol diphosphites wherein the alkyl groups each contain 8–18 carbon atoms. The amount of phosphite thus used should be from about 0.1 to about 1.5 phr.

Still another type of useful additive which may frequently be used in these polymer compositions is a dialkyl thiodipropionate having the structure (ROCOCH$_2$CH$_2$)$_2$S. The alkyl groups each contain 10–18 carbon atoms. These thiodipropionate esters act to reduce hydroperoxides to stable, nonradical products and thus have an antioxidant effect.

The amount of thiodipropionate should be from about 0.1 to about 0.5 phr.

Other polymer additives may also be used with the olefin polymer compositions herein including lubricants, antioxidants, other heat and ultraviolet stabilizers, antistatic agents, flame retardants, plasticizers, etc.

All parts and percentages herein are by weight, unless otherwise clearly stated.

We claim:

1. A substituted nitriloacetate having the structure

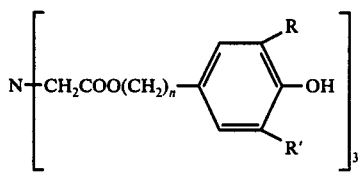

wherein R and R' are lower alkyl radicals and $n$ is 1–4.

2. The substituted nitriloacetate of claim 1 wherein R and R' are tertiary alkyl radicals.

3. A polymer composition containing a major proportion of an olefin polymer and a minor proportion, sufficient to provide heat and light stability, of the substituted nitriloacetate of claim 1.

4. The polymer composition of claim 3 wherein the olefin polymer is in fibrous form.

5. The polymer composition of claim 3 wherein said composition also contains a minor proportion of a dialkyl thiodipropionate.

6. The polymer composition of claim 3 wherein said composition also contains a minor proportion of a pentaerythritol diphosphite.

7. The polymer composition of claim 5 wherein the alkyl groups of the dialkyl thiodipropionate each contain 10–18 carbon atoms.

8. The polymer composition of claim 6 wherein the pentaerythritol diphosphite is a dialkylpentaerythritol diphosphite.

9. A polymer composition containing a major proportion of an olefin polymer, a minor proportion sufficient to provide heat and light stability of the substituted nitriloacetate of claim 1, and minor proportions of a dialkyl thiodipropionate and a pentaerythritol diphosphite.